(12) United States Patent
Knight

(10) Patent No.: US 8,713,281 B1
(45) Date of Patent: Apr. 29, 2014

(54) STORAGE DEVICE PERFORMANCE ALIGNMENT NOTIFICATION

(75) Inventor: Frederick Knight, Cary, NC (US)

(73) Assignee: Netapp, Inc., Sunnyvale, CA (US)

( * ) Notice: Subject to any disclaimer, the term of this patent is extended or adjusted under 35 U.S.C. 154(b) by 1174 days.

(21) Appl. No.: 12/344,168

(22) Filed: Dec. 24, 2008

(51) Int. Cl.
*G06F 3/06* (2006.01)

(52) U.S. Cl.
CPC .............. *G06F 3/061* (2013.01); *G06F 3/0608* (2013.01)
USPC .......................................... 711/171; 711/154

(58) Field of Classification Search
USPC .................................. 711/114, 170
See application file for complete search history.

(56) References Cited

U.S. PATENT DOCUMENTS

| | | | |
|---|---|---|---|
| 5,890,014 A * | 3/1999 | Long | 710/8 |
| 6,292,876 B1 * | 9/2001 | Golding | 711/163 |
| 6,711,574 B1 * | 3/2004 | Todd et al. | 1/1 |
| 2006/0174071 A1 * | 8/2006 | Justiss et al. | 711/154 |
| 2008/0126704 A1 * | 5/2008 | Ulrich et al. | 711/114 |
| 2008/0162811 A1 * | 7/2008 | Steinmetz et al. | 711/114 |
| 2013/0145106 A1 * | 6/2013 | Kan | 711/147 |

* cited by examiner

*Primary Examiner* — Kaushikkumar Patel
(74) *Attorney, Agent, or Firm* — Kacvinsky Daisak Bluni PLLC

(57) ABSTRACT

Storage device performance alignment notification includes informing a storage device of a starting logical block address (LBA) for each of one or more host containers to be stored on the storage device, and placing the one or more host containers at natural storage boundaries of the storage device based at least in part on the informing.

30 Claims, 9 Drawing Sheets

| Byte\Bit | 7 | 6 | 5 | 4 | 3 | 2 | 1 | 0 |
|---|---|---|---|---|---|---|---|---|
| 0 | PS | SPF | \multicolumn{6}{c|}{PAGE CODE (20h)} | | | | | |
| 1 | \multicolumn{8}{c|}{Subpage Code (0h)} | | | | | | | |
| 2 | \multicolumn{8}{c|}{Page Length (MSB)} | | | | | | | |
| 3 | \multicolumn{8}{c|}{Page Length (LSB)} | | | | | | | |
| 4 - 7 | \multicolumn{8}{c|}{Reserved} | | | | | | | |
| 8 - 15 | \multicolumn{8}{c|}{Starting LBA Of Container 1} | | | | | | | |
| 16 - 23 | \multicolumn{8}{c|}{Starting LBA Of Container 2} | | | | | | | |
| 24 - 31 | \multicolumn{8}{c|}{Starting LBA Of Container 3} | | | | | | | |
| 32 - 39 | \multicolumn{8}{c|}{Starting LBA Of Container 4} | | | | | | | |
| N - N+7 | \multicolumn{8}{c|}{Starting LBA Of Container N} | | | | | | | |
| ... | \multicolumn{8}{c|}{...} | | | | | | | |

FIG. 5

| Byte\Bit | 7 | 6 | 5 | 4 | 3 | 2 | 1 | 0 | |
|---|---|---|---|---|---|---|---|---|---|
| 0 | PS | SPF | PAGE CODE (20h) | | | | | | ⟵ 600 |
| 1 | Subpage Code (0h) | | | | | | | | |
| 2 | Page Length (MSB) | | | | | | | | |
| 3 | Page Length (LSB) | | | | | | | | |
| 4 - 7 | Reserved | | | | | | | | |
| 8 - 15 | Starting LBA Of Container 1 | | | | | | | | ⟵ 610 |
| 16 | Flags For Container 1 | | | | | | | | ⟵ 620 |
| 17 - 24 | Starting LBA Of Container 2 | | | | | | | | ⟵ 630 |
| 25 | Flags For Container 2 | | | | | | | | ⟵ 640 |
| 26 - 33 | Starting LBA Of Container 3 | | | | | | | | ⟵ 650 |
| 34 | Flags For Container 3 | | | | | | | | ⟵ 660 |
| 35 - 42 | Starting LBA Of Container 4 | | | | | | | | ⟵ 670 |
| 43 | Flags For Container 4 | | | | | | | | ⟵ 680 |
| 44 - 51 | Starting LBA Of Container N | | | | | | | | ⟵ 690 |
| 52 | Flags For Container N | | | | | | | | ⟵ 698 |
| ... | ... | | | | | | | | |

| Bit Flags: | 7 | 6 | 5 | 4 | 3 | 2 | 1 | 0 | |
|---|---|---|---|---|---|---|---|---|---|
| | Reserved For Future | | | | | EAB LBA | SAB LBA | Align | ⟵ 602 |

| Byte\Bit | 7 | 6 | 5 | 4 | 3 | 2 | 1 | 0 |
|---|---|---|---|---|---|---|---|---|
| 0 | Operation Code ||||||||
| 1 | Reserved ||| Service Action (10h) |||||
| 2 | Management Protocol ||||||||
| 3 | Management Protocol Specific1 ||||||||
| 5 | ||||||||
| 6 | (MSB) | Parameter List Length |||||| |
| 9 | |||||||(LSB) |
| 10 | Management Protocol Specific2 ||||||||
| 11 | Control ||||||||

| Code | Description | Reference |
|---|---|---|
| 00h - 2Fh | Reserved | |
| 30h - 35h | Defined By The SNIA | 3.1.120 |
| 36h - EFh | Reserved | |
| F06 - FFh | Vendor-specific | |

| | Byte\Bit | 7 | 6 | 5 | 4 | 3 | 2 | 1 | 0 | |
|---|---|---|---|---|---|---|---|---|---|---|
| 710 | 0 - 7 | Starting LBA Of Container 1 |||||||| 715 |
| 720 | 8 - 15 | Starting LBA Of Container 2 |||||||| 725 |
| 730 | 16 - 23 | Starting LBA Of Container 3 |||||||| 735 |
| 740 | N - N+7 | Starting LBA Of Container N |||||||| 745 |
| 750 | ... | ... |||||||| 755 |

STORAGE DEVICE PERFORMANCE ALIGNMENT NOTIFICATION

FIELD OF THE INVENTION

The present invention relates to the field of computer science. More particularly, the present invention relates to storage device performance alignment notification.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage device implemented, by the system. The storage system may be implemented in accordance with a variety of storage architectures including, but not limited to, a network-attached storage environment, a storage are network, and a disk assembly directly attached to a client or host computer. The storage devices are typically disk drives organized as a disk array, managed according to a storage protocol, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize storage containers for the information. For example, the information may be stored on the disks as a hierarchical structure of directories, files, and blocks. Each "on-disk" file may be implemented as a set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of its fbns on a per-file basis, whereas vbns are assigned over a larger volume address space. The file system organizes the data blocks within the vbn space as a "logical volume"; each logical volume may be, although it is not necessarily, associated with its own file system. The file system typically consists of a contiguous range of vbns from zero to n, for a file system of size n+1 blocks.

Host virtualization disassociates storage capacity from its underlying physical disk restrictions to create large pools of storage that are made available to multiple hosts running different operating systems. These pools of virtual capacity can be configured as virtual disks and presented to any or all connected hosts. Virtual disks are created from these pools and are dynamically allocated to servers on the network as logical storage when needed.

The boundaries of a storage device are usually based on an eight-bit character, known as a byte. Natural storage boundaries of a particular storage device are based upon a multiple number of bytes. Each storage device performs Input/Output (I/O) operations that transfer fixed-sized units at natural storage boundaries specific to the storage device. A block that is stored on a storage device beginning at a natural storage boundary of the storage device is said to be naturally aligned with the storage device. There are boundaries where I/O operations that naturally align have higher performance than when those boundaries do not align. For example, if a storage device always performs I/O operations in multiples of 4K (4,096 bytes) starting at block 0, then a host that sends I/O operations in multiples of 4K that are always on a 4K boundary will have optimal performance. Whereas a different host that sends I/O operations of 4K, but sends those I/O operations on a 2K boundary will force the storage device to perform additional work that will reduce the performance of those I/O operations.

Accordingly, a need exists for an improved solution for storage. A further need exists for an improved solution for storage in a host virtualization environment.

SUMMARY OF THE INVENTION

The present invention overcomes the disadvantages of the prior art by having a host which "owns" a storage container, inform a storage device providing storage for the storage container, of the address that the host uses to refer to the start of the storage container. The storage device reads and writes chunks of data of a particular size. Each chunk of data stored on the storage device is aligned on a natural storage boundary that is specific to the storage device. Accessing a storage container stored on the storage device requires performing one or more read or write operations, depending on the number of chunks on the storage device that contain the host's storage container. The storage device uses the address provided by the host to store the storage container at a natural storage boundary of the storage device. Subsequent data access by the host is optimized because the read and write operations by the host are at naturally aligned storage boundaries. Each naturally aligned read and write operation operates on a smaller number of chunks than non-aligned read and write operations.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 5 is a table that illustrates a vendor-unique mode page for use in communicating a starting logical block address (LBA) for each of one or more host containers to be stored on a storage device in accordance with one embodiment of the present invention.

FIG. 6A is a table that illustrates a vendor-unique mode page for use in communicating a starting logical block address (LBA) and associated attributes for each of one or more host containers to be stored on a storage device in accordance with one embodiment of the present invention.

FIG. 6B is a table that illustrates the associated attributes field of FIG. 7A in accordance with one embodiment of the present invention.

FIG. 7A is a table that illustrates a vendor-unique command for use in communicating a starting logical block address (LBA) for each of one or more host containers to be stored on a storage device in accordance with one embodiment of the present invention.

FIG. 7B is a table that illustrates a vendor-unique management protocol field value for use in communicating a starting logical block address (LBA) for each of one or more host containers to be stored on a storage device in accordance with one embodiment of the present invention.

FIG. 7C is a table that illustrates a vendor-unique parameter list for use in communicating a starting logical block address (LBA) for each of one or more host containers to be stored on a storage device in accordance with one embodiment of the present invention.

DETAILED DESCRIPTION

Figure 1:
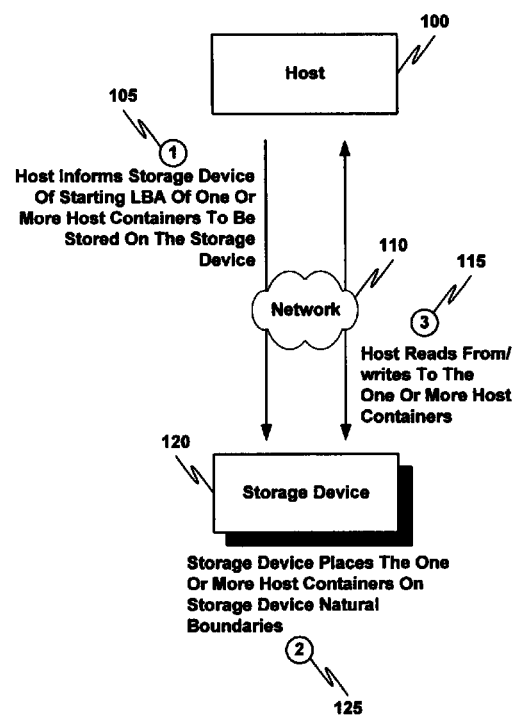
FIG. 1 is a block diagram that illustrates a system for storage device performance alignment notification in accordance with one embodiment of the present invention.

Embodiments of the present invention are described herein in the context of storage device performance alignment notification. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

Host virtualization disassociates storage capacity from its underlying physical disk restrictions to create large pools of storage that are made available to multi-vendor hosts running different operating systems. These pools of virtual capacity can be configured as virtual disks and presented to any or all connected hosts. Virtual disks are created from these pools and are dynamically allocated to servers on the network as logical storage when needed. Host virtualization allows for more efficient use of storage capacity, fault tolerance, data security, simplified management, and overall reduction in costs.

Example embodiments of the present invention inform a storage device of the starting logical address of a storage container to be stored on the storage device. The storage device stores the storage container at particular physical locations on the storage device so as to optimize subsequent access by the host, of the data in the storage container stored on the storage device.

A host informs the storage device of the starting logical address for a container to be stored on the storage device. The host may inform the storage device of the starting logical address by, for example, using a vendor-unique command of a communication protocol. To aid their design, development, maintenance, and support, electronic storage devices (ESDs) include vendor unique commands (VUCs). I/O interface specifications for ESDs (e.g., SCSI, ATA) make provisions for vendor unique commands by setting aside a range of command codes for this use. Vendor unique commands are a set of commands carried by the protocols of the I/O interface specification created by storage device vendors for their own purposes, such as testing and verification of their designs.

According to another embodiment of the present invention, the host may also inform the storage device of the starting logical address by using a vendor-unique mode page of a communication protocol.

The storage device places the storage container on the storage device, starting at a storage device physical address that is a natural storage boundary of the storage device. Storing the storage container at the particular physical storage locations provides improved performance when the host subsequently interfaces with the storage device to access data in the storage container stored on the storage device, such as when the host writes data to the storage container or when the host reads data stored in the storage container device.

The host may be configured to operate according to a host operating system that is allocated to one or more virtual disks of a virtualization layer, with each of the one or more virtual disks being mapped to physical storage locations on the storage device.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors, AIX available from IBM Corporation, HP-UX available from Hewlett Packard Corporation; or others. In addition, the OS may run as a guest system within a host virtual system (such as ESX, available from VMWARE, Hyper-V, available from Microsoft Corporation, HP-VM, available from Hewlett Packard, or XEN, or other virtual hosting software), or as the sole native OS running on a system. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines.

Different implementations may employ distributed architectures, to facilitate clustering of storage nodes. Clustering facilitates scaling of performance and storage capacity. For example, rather than being implemented in a single box, a storage server may include a separate N- ("network") module and D- (disk) module, which are contained within separate housings and communicate with each other via some type of switching fabric or other communication medium. Each D-module may manage a separate set of disks. Storage servers which implement the Data ONTAP® GX operating system from NetApp can have this type of distributed architecture.

In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "flags field" describes one or more bits that are used to store a binary value or code that has an assigned meaning.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data stores" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "container" or "storage container" describes a data grouping. A "host container" is a container stored on a host.

In the context of the present invention, the term "network interface" describes the means by which users access a network for the purposes of communicating across it or retrieving information from it.

In the context of the present invention, the term "user interface" describes any device or group of devices for presenting and/or receiving information and/or directions to and/or from persons. A user interface may comprise a means to present information to persons, such as a visual display projector or screen, a loudspeaker, a light or system of lights, a printer, a Braille device, a vibrating device, or the like, and associated control software. A user interface may also include a means to receive information or directions from persons, such as one or more or combinations of buttons, keys, levers, switches, knobs, touch pads, touch screens, microphones, speech detectors, motion detectors, cameras, and light detectors, or the like, and associated control software. A user interface may also comprise the information presented to persons, the information received from persons, or both. Exemplary user interfaces comprise pagers, mobile phones, desktop computers, laptop computers, handheld and palm computers, personal digital assistants (PDAs), cathode-ray tubes (CRTs), keyboards, keypads, liquid crystal displays (LCDs), control panels, horns, sirens, alarms, printers, speakers, mouse devices, consoles, and speech recognition devices.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

FIG. 1 is a block diagram that illustrates a system for storage device performance alignment notification in accordance with one embodiment of the present invention. As shown in FIG. 1, a system for storage performance alignment notification comprises a host 100 communicatively coupled via a network 110 to one or more storage devices 220. Host 200 is configured to inform storage device 110 of the starting LBA of one or more host containers to be stored on the storage device 120. Host 100 is further configured to access at least part of the one or more host containers on the storage device 120. The accessing may comprise the reading of at least part of the one or more host containers stored on the storage device 120. The accessing may also comprise the storing of at least part of the one or more host containers on the storage device 120.

Still referring to FIG. 1, storage device 120 is configured to receive an indication of the starting LBA of one or more host containers to be stored on the storage device 120. Storage device 120 is further configured to place the one or more host containers on the storage device at natural storage boundaries. Storage device 120 is further configured to access the one or more host containers on the storage device 120. The accessing may comprise the reading of at least part of the one or more host containers stored on the storage device 120. The accessing may also comprise the storing of at least part of the one or more host containers on the storage device 120.

Storage device 120 may be any type of attached array of writable storage media such as video tape, optical, DVD, magnetic tape, bubble memory, electronic random access memory, micro-electro mechanical, and any other similar media adapted to store information, including data and parity information. The information may be stored on disks, such as hard disk drives (HDDs) and/or direct access storage devices (DASDs).

According to one embodiment of the present invention, storage device 120 comprises two or more physical disks organized as a RAID (Redundant Array of Independent (or Inexpensive) Disks) system, or the like.

Figure 2:
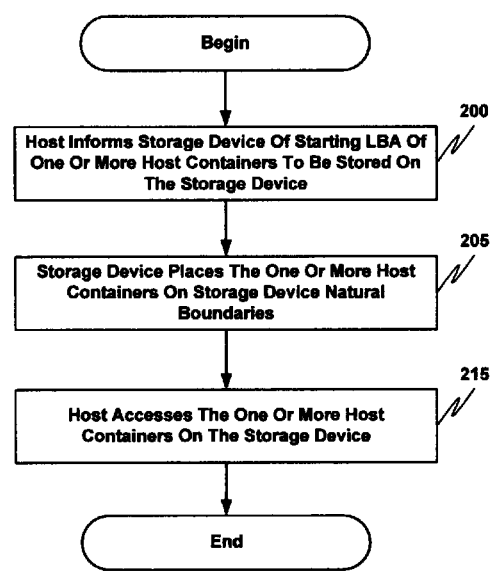
FIG. 2 is a flow diagram that illustrates a method for storage device performance alignment notification in accordance with one embodiment of the present invention.

FIG. 2 is a flow diagram that illustrates a method for storage device performance alignment notification in accordance with one embodiment of the present invention. The processes illustrated in FIG. 2 may be implemented in hardware, software, firmware, or a combination thereof. At 200, a host informs a storage device of the starting LBA of one or more host containers to be stored on the storage device. For example, host 100 may send a message to network storage device 120 via network 110, informing storage device 120 of the starting LBA of one or more containers of host 100 to be stored on storage device 120. At 205, the storage device places the one or more host containers on the storage device at natural storage boundaries. For example, storage device 120 may place the one or more host containers at natural storage boundaries of the storage device 120. At 215, the host accesses at least part of the one or more host containers on the storage device. For example, host 100 may access a file within one of the one or more host containers on storage device 120. The accessing may comprise the reading of at least part of the one or more host containers stored on the storage device. The accessing may also comprise the storing of at least part of the one or more host containers on the storage device.

Figure 3:
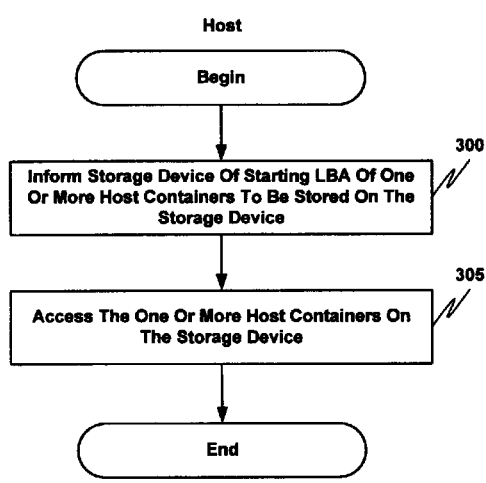
FIG. 3 is a flow diagram that illustrates a method for storage device performance alignment notification from the perspective of a host in accordance with one embodiment of the present invention.

FIG. 3 is a flow diagram that illustrates a method for storage device performance alignment notification from the perspective of a host in accordance with one embodiment of the present invention. The processes illustrated in FIG. 3 may be implemented in hardware, software, firmware, or a combination thereof. The processes illustrated in FIG. 3 may be performed by a host, such as host 100 of FIG. 1. At 300, the host informs a storage device of the starting LBA of one or more host containers to be stored on the storage device. For example, host 100 may inform storage device 120 of the starting LBA of one or more containers of host 100 to be stored on storage device 120. At 305, the host accesses at least part of the one or more host containers on the storage device. For example, host 100 may access at least part of the one or more host containers on storage device 120. The accessing may comprise the reading of at least part of the one or more host containers stored on the storage device. The accessing may also comprise the storing of at least part of the one or more host containers on the storage device.

Figure 4:
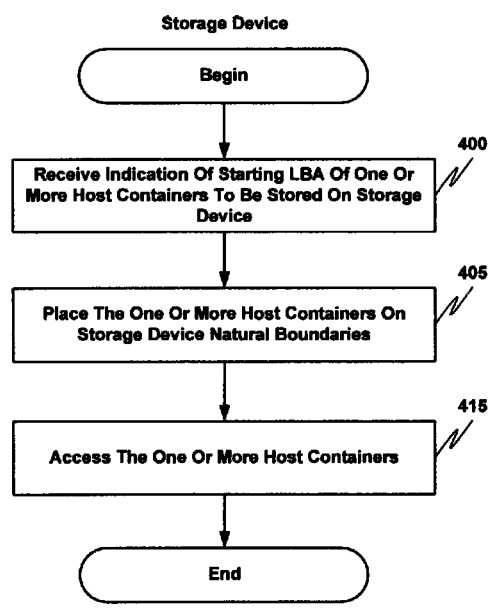
FIG. 4 is a flow diagram that illustrates a method for storage device performance alignment notification from the perspective of a storage device in accordance with one embodiment of the present invention.

FIG. 4 is a flow diagram that illustrates a method for storage device performance alignment notification from the perspective of a storage device in accordance with one embodiment of the present invention. The processes illustrated in FIG. 4 may be implemented in hardware, software, firmware, or a combination thereof. The processes illustrated in FIG. 4 may be performed by a storage device, such as storage device 120 of FIG. 1. At 400, a storage device receives an indication of the starting LBA of one or more host containers to be stored on the storage device. For example, storage device 120 may receive an indication of the starting LBA of one or more containers of host 100 to be stored on storage device 120. At 405, the one or more host containers are placed on the storage device at natural storage boundaries. For example, the one or more containers of host 100 are placed on the storage device 120 at natural storage boundaries of the storage device 120. At 410, at least part of the one or more host containers are accessed on the storage device. For example, a file of a host container may be accessed on storage device 120 The accessing may comprise the reading of at least part of the one or more host containers stored on the storage device. The accessing may also comprise the storing of at least part of the one or more host containers on the storage device.

FIGS. 5-7C illustrate communicating an LBA for each of one or more host containers to be stored on a storage device in accordance with example embodiments of the present invention. FIGS. 5 and 6A-6B illustrate using a vendor-unique mode page of a communication protocol for communicating the information, and FIGS. 7A-7C illustrate using a vendor-unique command of a communication protocol for communicating the information. Both embodiments are illustrated within the context of the SCSI protocol. The SCSI protocol provides multiple ways for vendors to extend the protocol for both managing the device and for transferring data between the device and the host. Use of vendor-unique mode pages and vendor-unique commands are just two ways for vendors to extend the protocol. Those of ordinary skill in the art will recognize other communication protocols may be used. In addition, those of ordinary skill in the art will recognize other mechanisms for extending a particular communication protocol may be used to communicate an LBA for each of one or more host containers to be stored on a storage device, in accordance with embodiments of the present invention.

Turning now to FIG. 5, a table that illustrates a vendor-unique mode page for use in communicating a starting logical block address (LBA) for each of one or more host containers to be stored on a storage device in accordance with one embodiment of the present invention is presented. According to the SCSI standard, mode pages 0x0 and 0x20-0x3E are defined as vendor-unique. According to this embodiment of the present invention, one of these vendor-unique mode pages are used to transfer an LBA for each of one or more host containers to be stored on a storage device. FIG. 5 shows using mode page 20h (600). The starting LBA of each host container is specified beginning at 510. The mode page grows to a size large enough to accommodate each of the starting LBAs corresponding to the containers to be used by the host.

Turning now to FIG. 6A, a table that illustrates a vendor-unique mode page for use in communicating a starting logical block address (LBA) and associated attributes for each of one or more host containers to be stored on a storage device in accordance with one embodiment of the present invention is presented. FIG. 6 is similar to FIG. 5, except FIG. 6 includes attribute information for each LBA. As shown in FIG. 6A, each of the starting LBAs for containers 610, 630, 650, 670, and 690 is associated with corresponding flags 620, 640, 660, 680, and 698, respectively. FIG. 6B shows flag fields 620, 640, 660, 680, and 698 in more detail. According to one embodiment of the present invention, if bit 602 is set, the LBA is a starting location for an aligned container. Other bits 604 may be used to indicate other attributes of the respective container. According to one embodiment of the present invention, a flags field (603) indicates whether the associated LBA is the starting point for automatic backups. According to another embodiment of the present invention, a flags field (605) indicates whether the associated LBA is the ending point for automatic backups. Those of ordinary skill in the art will recognize a flag field (604) may be used to represent other attributes associated with a container's LBA.

Turning now to FIG. 7A, a table that illustrates a vendor-unique command for use in communicating a starting logical block address (LBA) for each of one or more host containers to be stored on a storage device in accordance with one embodiment of the present invention, is presented. FIG. 7A shows the "management protocol out" command as specified in the T10 SPC standard. Field 700 is for use in specifying a management protocol.

FIG. 7B shows the possible codes defined for field 700 of FIG. 7A, in accordance with one embodiment of the present invention. As shown in FIG. 7B, the values F0h-FFh (705) are defined for vendor-unique extensions. FIG. 7C is a table that illustrates using one of the values indicated by reference numeral 705 of FIG. 7B (e.g., the value F0h) to specify the starting LBA for each of one or more host containers to be stored on a storage device. The starting LBA of each host container is specified beginning at 715. The parameter data grows to a size large enough to accommodate each of the starting LBAs (as specified by the length in the page length field) corresponding to the containers to be used by the host. Alternatively, a different page length field may be specified.

Figure 8:
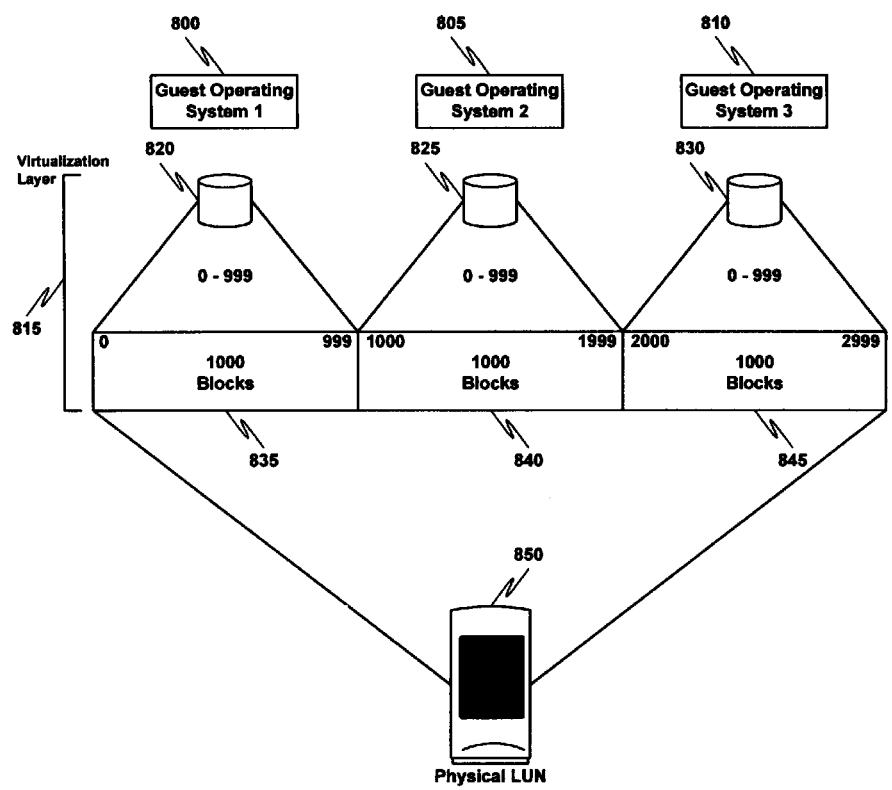
FIG. 8 is a block diagram that illustrates a system for storage device performance alignment notification in accordance with one embodiment of the present invention.

FIG. 8 is a block diagram that illustrates a system for storage device performance alignment notification in accordance with one embodiment of the present invention. As shown in FIG. 8, guest operating systems 800, 805, and 810 are allocated virtual disks 820, 825, and 830, respectively, in virtualization layer 815. The storage system shown in FIG. 8 allows fault-tolerant and secure access by one or more hosts to one or more physical storage devices 850 independent of a particular operating system being executed by each of the hosts. Each of operating systems 800, 805, 810 may be the same operating system. Alternatively, one or more of operating systems 900, 905, 910 may be from different vendors, or different versions of operating systems from the same vendor.

Each of virtual disks 820, 825, and 830 uses 1000 logical blocks 835, 840, 845, respectively. Virtual disks 820, 825, and 830 are mapped to physical storage locations in storage device 950, such as a RAID controller having one or more disks. Each of the guests 800, 805, 810 corresponds to host 100 of FIG. 1. Storage device 850 corresponds to storage device 125 of FIG. 1.

The storage system shown in FIG. 8 may be implemented in accordance with a variety of storage architectures, including a network-attached storage environment, a storage area network, and a disk assembly directly attached to a client or host computer. Furthermore, the number of logical blocks (835, 840, 845) and guest operating systems (800, 805, 810) shown in FIG. 8 is for illustrative purposes only. A different number of guest operating systems or logical blocks than what is illustrated in FIG. 8 may be used. Furthermore, the number of logical blocks used by one virtual disk may differ from the number of logical blocks used by another virtual disk mapped to physical storage locations of the same storage device.

Still referring to FIG. 8, suppose storage device 850 always performs 4K I/O operations (starting at block 0). And suppose guest 800 always sends I/O operations to its virtual disk 820 in multiples of 4K that are always on a 4K boundary, and guest 805 sends I/O operations to its virtual disk 825 in multiples of 4K, but sends those I/Os on a 2K boundary. According to embodiments of the present invention, the host virtualization layer 815 communicates to storage device 850, the starting LBAs of the virtual container (820, 825, 830). For example, the starting LBAs may be communicated to the storage device 850 using a vendor-unique mode page as discussed above with reference to FIGS. 5-6B. As a further example, the starting LBAs may be communicated to the storage device 850 using a vendor-unique command as discussed above with reference to FIGS. 7A-7C. Alternatively, other methods may be employed to communicate the starting LBAs to the storage device 850.

Upon receiving the starting LBAs of the virtual container (820, 825, 830), storage device 850 aligns the packages at natural storage boundaries (4K in this example). Because the virtual containers (820, 825, 830) are aligned at natural storage boundaries of the storage device 850, the virtual containers (820, 825, 830) occupy the minimum number of 4K storage areas on the storage device 850. Since the number of I/O operations required to access the virtual containers (820, 825, 830) on the storage device 850 depends upon the number of 4K storage areas on the storage device 850 that contain the data for the virtual containers (820, 825, 830), and on the alignment of those areas relative to the access, the number of I/O operations required to access the virtual containers (820, 825, 830) on the storage device 850 is minimized, thus optimizing I/O operation performance for each guest operating system (800, 805, 810). For example, if a 4K record is written on a 2K boundary, the storage device must read 8K (each of the 4K regions that contain the parts being updated), and then update the last 2K of the first region and the first 2K of the next region, and then re-write both regions. In this way, a single 4K write operation turns into an 8K read operation and an 8K write operation. If the read and write operations were aligned at natural storage boundaries, only a single 4K write operation would be required (with no read operations). Whereas in example embodiments of the present invention, the host informs a storage device what boundary the host intends to use, so that the storage device can align the specified LBA on a storage device natural boundary; host accesses will then be on those boundaries, resulting in improved performance.

Figure 9:
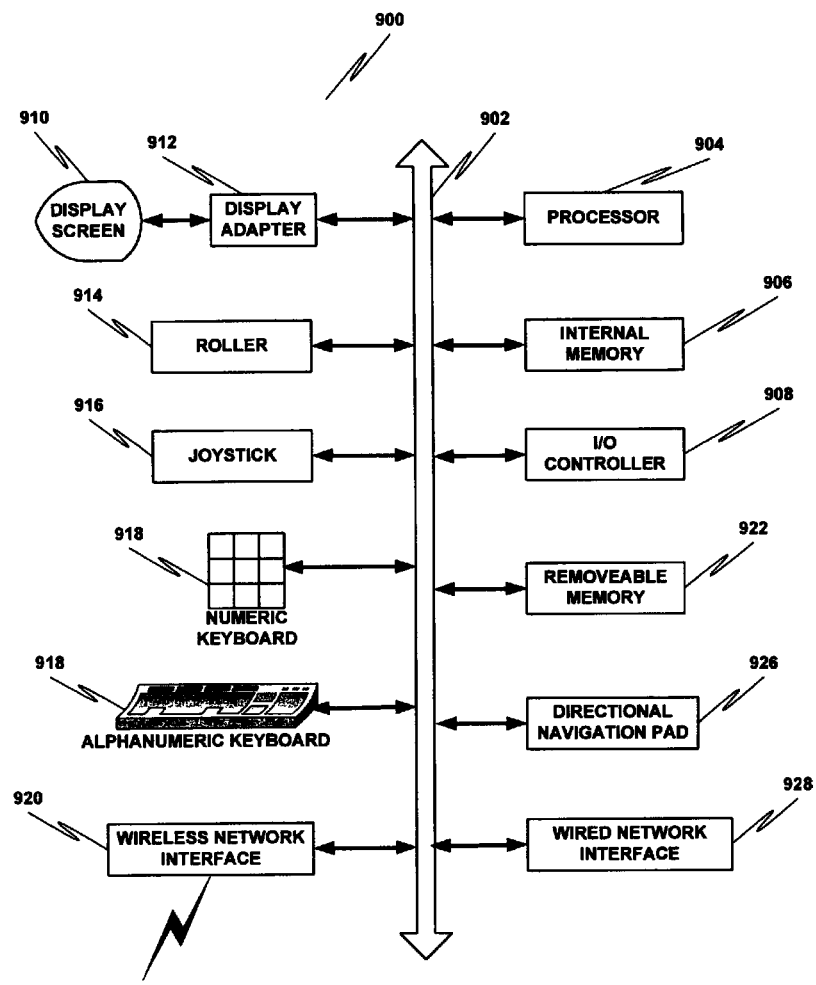
FIG. 9 is a block diagram of a computer system suitable for implementing aspects of the present invention.

FIG. 9 depicts a block diagram of a computer system 900 suitable for implementing aspects of the present invention. As shown in FIG. 9, system 900 includes a bus 902 which interconnects major subsystems such as a processor 904, an internal memory 906 (such as a RAM), an input/output (I/O) controller 908, a removable memory (such as a memory card) 922, an external device such as a display screen 910 via display adapter 912, a roller-type input device 914, a joystick 916, a numeric keyboard 918, an alphanumeric keyboard 918, directional navigation pad 926 and a wireless interface 920. Many other devices can be connected. Wireless network interface 920, wired network interface 928, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 9 to be present to practice the present invention. Furthermore, the devices and subsystems may be interconnected in different ways from that shown in FIG. 9. Code to implement the present invention may be operably disposed in internal memory 906 or stored on storage media such as removable memory 922, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), a CD-ROM (Compact Disc read-only memory), or a direct-attach disk drive connected through a traditional storage controller.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
   storing data on a virtual storage system for use by a plurality of hosts, each host owning a plurality of virtual containers, the virtual storage system comprising a plurality of storage devices for storing a plurality of virtual containers, each virtual container comprising a data grouping;
   sending, from a first host, a vendor-unique command to a first storage device, the vendor-unique command specifying a plurality of starting logical block addresses (LBAs) for a plurality of virtual containers owned by the first host, each starting LBA being used by the first host to refer to a start of a virtual container owned by the first host, the vendor-unique command from a communication protocol that reserves a range of commands for maintenance or support of storage devices, the range of commands comprising the vendor-unique command, the vendor-unique command comprising a parameter data size that increases to accommodate each starting LBA for the plurality of virtual containers owned by the first host; and
   placing the plurality of virtual containers at natural storage boundaries of the first storage device based on the vendor-unique command, each virtual container being mapped to a storage device physical address that starts at a natural storage boundary of the first storage device.

2. The method of claim 1 wherein
   each of the plurality of virtual containers are associated with a host configured to operate according to a host operating system; and
   the host operating system is allocated one or more virtual disks of a virtualization layer, each virtual disk comprising a virtual container.

3. The method of claim 1, further comprising accessing at least part of one or more virtual containers on the first storage device.

4. The method of claim 3 wherein the accessing further comprises reading at least part of one or more virtual containers on the first storage device.

5. The method of claim 3 wherein the accessing further comprises storing at least part of one or more virtual containers on the first storage device.

6. The method of claim 1 wherein a storage device comprises two or more physical disks organized as a RAID system.

7. The method of claim 1, wherein each storage device reads and writes data blocks of a particular data size, wherein each data block stored on the storage device is aligned on a natural storage boundary of the storage device.

8. A method comprising:
   storing data on a virtual storage system for use by a plurality of hosts, each host owning a plurality of virtual containers, the virtual storage system comprising a plurality of storage devices for storing a plurality of virtual containers, each virtual container comprising a data grouping;
   sending, from a first host, a vendor-unique mode page to a first storage device, the vendor-unique mode page specifying a plurality of starting logical block addresses (LBAs) for a plurality of virtual containers owned by the first host, each starting LBA being used by the first host to refer to a start of a virtual container owned by the first host, the vendor-unique mode page further specifying associated attributes for each virtual container, the vendor-unique mode page comprising a data size that increases to accommodate each starting LBA for the plurality of virtual containers owned by the first host; and
   placing the plurality of virtual containers at natural storage boundaries of the first storage device based on the vendor-unique mode page, each virtual container being mapped to a storage device physical address that starts at a natural storage boundary of the first storage device.

9. The method of claim 8 wherein
   each of the plurality of virtual containers are associated with a host configured to operate according to a host operating system; and
   the host operating system is allocated one or more virtual disks of a virtualization layer, each virtual disk comprising a virtual container.

10. The method of claim 8, further comprising:
    after the placing, accessing at least part of one or more virtual containers on the first storage device.

11. The method of claim 10 wherein the accessing further comprises reading at least part of one or more virtual containers on the first storage device.

12. The method of claim 10 wherein the accessing further comprises storing at least part of one or more virtual containers on the first storage device.

13. The method of claim 8 wherein a storage device comprises two or more physical disks organized as a RAID system.

14. The method of claim 8, wherein each storage device reads and writes data blocks of a particular data size, wherein each data block stored on the storage device is aligned on a natural storage boundary of the storage device.

15. The method of claim 8, wherein the associated attributes for a virtual container specified by the vendor-unique mode page comprises an LBA starting point for automatic backups or an LBA ending point for automatic backups for the virtual container.

16. An apparatus comprising:
    a memory; and
    a processor configured to:
        store data on a virtual storage system for use by a plurality of hosts, each host owning a plurality of virtual containers, the virtual storage system comprising a plurality of storage devices for storing a plurality of virtual containers, each virtual container comprising a data grouping;
        send, from a first host, a vendor-unique command to a first storage device, the vendor-unique command specifying a plurality of starting logical block addresses (LBAs) for a plurality of virtual containers owned by the first host, each starting LBA being used by the first host to refer to a start of a virtual container owned by the first host, the vendor-unique command from a communication protocol that reserves a range of commands for maintenance or support of storage devices, the range of commands comprising the vendor-unique command, the vendor-unique command comprising a parameter data size that increases to accommodate each starting LBA for the plurality of virtual containers owned by the first host; and
        place the plurality of virtual containers at natural storage boundaries of the first storage device based on the vendor-unique command, each virtual container being mapped to a storage device physical address that starts at a natural storage boundary of the first storage device.

17. The apparatus of claim 16 wherein
each of the plurality of virtual containers are associated with a host configured to operate according to a host operating system; and
the host operating system is allocated one or more virtual disks of a virtualization layer, each virtual disk comprising a virtual container.

18. The apparatus of claim 16 wherein the processor is further configured to access at least part of one or more virtual containers on the first storage device.

19. The apparatus of claim 18 wherein the processor is further configured to read at least part of one or more virtual containers on the first storage device.

20. The apparatus of claim 18 wherein the processor is further configured to store at least part of one or more virtual containers on the first storage device.

21. The apparatus of claim 16 wherein a storage device comprises two or more physical disks organized as a RAID system.

22. The apparatus of claim 16, wherein each storage device reads and writes data blocks of a particular data size, wherein each data block stored on the storage device is aligned on a natural storage boundary of the storage device.

23. An apparatus comprising:
a memory; and
a processor configured to:
store data on a virtual storage system for use by a plurality of hosts, each host owning a plurality of virtual containers, the virtual storage system comprising a plurality of storage devices for storing a plurality of virtual containers, each virtual container comprising a data grouping;
send, from a first host, a vendor-unique mode page to a first storage device, the vendor-unique mode page specifying a plurality of starting logical block addresses (LBAs) for a plurality of virtual containers owned by the first host, each starting LBA being used by the first host to refer to a start of a virtual container owned by the first host, the vendor-unique mode page further specifying associated attributes for each virtual container, the vendor-unique mode page comprising a data size that increases to accommodate each starting LBA for the plurality of virtual containers owned by the first host; and
place the plurality of virtual containers at natural storage boundaries of the first storage device based on the vendor-unique mode page, each virtual container being mapped to a storage device physical address that starts at a natural storage boundary of the first storage device.

24. The apparatus of claim 23 wherein
each of the plurality of virtual containers are associated with a host configured to operate according to a host operating system; and
the host operating system is allocated one or more virtual disks of a virtualization layer, each virtual disk comprising a virtual container.

25. The apparatus of claim 23 wherein the processor is further configured to, after the placing, access at least part of one or more virtual containers on the first storage device.

26. The apparatus of claim 25 wherein the processor is further configured to read at least part of one or more virtual containers on the first storage device.

27. The apparatus of claim 25 wherein the processor is further configured to store at least part of one or more virtual containers on the first storage device.

28. The apparatus of claim 23 wherein a storage device comprises two or more physical disks organized as a RAID system.

29. The apparatus of claim 23, wherein each storage device reads and writes data blocks of a particular data size, wherein each data block stored on the storage device is aligned on a natural storage boundary of the storage device.

30. The apparatus of claim 23, wherein the associated attributes for a virtual container specified by the vendor-unique mode page comprises an LBA starting point for automatic backups or an LBA ending point for automatic backups for the virtual container.

* * * * *